United States Patent
Ward

(10) Patent No.: US 7,309,093 B2
(45) Date of Patent: Dec. 18, 2007

(54) SWING-OUT TOOL CHEST

(76) Inventor: Clinton Ward, 414 County Rd. 1410, Chickasha, OK (US) 73018-8124

( * ) Notice: Subject to any disclaimer, the term of this patent is extended or adjusted under 35 U.S.C. 154(b) by 43 days.

(21) Appl. No.: 11/406,583

(22) Filed: Apr. 18, 2006

(65) Prior Publication Data

US 2007/0241580 A1    Oct. 18, 2007

(51) Int. Cl.
*B60R 9/00* (2006.01)
*B60R 9/06* (2006.01)
(52) U.S. Cl. ............... 296/37.6; 224/404; 206/349
(58) Field of Classification Search .............. 296/37.6; 224/403, 404; 206/349
See application file for complete search history.

(56) References Cited

U.S. PATENT DOCUMENTS

| | | | |
|---|---|---|---|
| 3,664,704 A * | 5/1972 | Ellis | 296/37.6 |
| 4,564,167 A | 1/1986 | Smith | |
| 5,743,584 A * | 4/1998 | Lance et al. | 296/37.6 |
| 5,924,616 A * | 7/1999 | Shives | 224/404 |
| 6,007,128 A * | 12/1999 | Hines, Jr. | 296/37.6 |
| 2003/0189353 A1 * | 10/2003 | Moore | 296/37.6 |

OTHER PUBLICATIONS

Craftsman 46 in. Tool Storage Collection, Green (Internet) Apr. 18, 2006.
"Machinist's toolchest, 1860s" (Internet) Printed Apr. 18, 2006.
Snap-on Roll Cab, Single Bank, 5 drawers, Red (Internet) Printed Apr. 18, 2006.

* cited by examiner

*Primary Examiner*—Dennis Pedder
*Assistant Examiner*—Melissa Black
(74) *Attorney, Agent, or Firm*—James T. Robinson; Exclusivity-Law, Inc.

(57) ABSTRACT

A swing-out tool chest provides a multi-drawer tool storage chest for organization of tools. The multi-drawer tool storage chest is pivotally mounted in the rear corner of the pickup bed or near the rear doors of a utility van. When not in use, the swing-out tool chest nestles against the side of the vehicle between the tailgate (or rear doors of a utility van) and the wheel well. To gain access to the tools, the operator opens the tailgate and swings the swing-out tool chest toward the rear of the bed. The tools are easily accessible and, in the case of a pickup, the tail gate provides a convenient work area. The present invention further includes a method of converting a commercially available locking tool storage chest to a swing-out tool chest mounted in a pickup bed, van, utility truck, or other vehicle.

17 Claims, 6 Drawing Sheets

SWING-OUT TOOL CHEST

BACKGROUND OF THE INVENTION

1. Background

This invention relates to vehicle-mounted tool chests and, more specifically but not by way of limitation, to a swing-out tool chest mounted in a pickup, van, utility truck, or other vehicle. For convenience, the invention is illustrated in conjunction with a pickup. It will be understood by one skilled in the art, however, that the swing-out tool chest invention is suitable for mounting at the rear of a van, at the rear of a sport utility vehicle (SUV), or on the frame of a utility truck. The swing-out tool chest of the present invention combines the organizational benefits normally associated with a machinist's tool chest (sometimes also referred to herein, in the alternative, as a machinist's tool box) with the mobility of a pickup or other utility vehicle. This invention also discloses a method for converting a commercially available locking tool chest to a swing-out tool chest.

2. Discussion

Tool chests have evolved along functional lines. Records show a machinist's tool chest belonged to Charles Potter, who worked at the Taunton Locomotive Works in Taunton, Mass. Potter started there as an apprentice in 1863, at the age of eighteen, and stayed as a machinist and later a foreman until the plant closed in 1902. Like other master craftsmen at large metalworking factories, Potter probably contracted with the management to produce subassemblies of a given quality at a specific price. The company provided machinery and materials and paid the wages of the men who worked for Potter, but Potter took responsibility for profit or loss on the contract. The drawers and compartments of a machinist's tool chest organized the machinist's precision tools and protected them from damage. A lock kept the tools from being "borrowed." The tool chest also symbolized the autonomy once enjoyed by skilled workers. Management may have controlled the physical workplace, but factory workers still retained some sense of independence through their skill and ownership of tools.

Today, machinist's tool chests are available with wheels and without wheels. Some tool chests include drop-front panels of double-wall construction for added rigidity and tool security. Integral side panel/slide construction evenly distributes and transfers drawer loads to the chest bottom panel. Thick, wool felt drawer liners are available to help keep tools clean and protect against corrosion. Typically, chests come with cylinder lock and milled key changes to help protect contents. Tool chest lid hinges are sometimes equipped with rust-resistant, stainless-steel pins which are staked to prevent punch-out and lid removal. Slide limit stops prevent drawers from extending beyond the tool chest frame. Tool chests come in various finishes.

In today's industrial environments, maintenance personnel have the same need for organized tools as the machinists of the nineteenth and twentieth centuries. A modern mobile tool box is, essentially, a machinist's tool chest mounted on industrial-grade casters. Like the machinists of the nineteenth and twentieth centuries, twenty-first century maintenance personnel often provide both their tools and the mobile tool chest in which their tools are stored.

Both specialized suppliers and retail chains offer tool chests on rollers. Rolling tool chests may have 10 or more drawers and feature a smooth carriage slide system with ball bearing rollers. Drawer capacities of up to 400 pounds per drawer are available, and some industrial casters are rated at 850 pounds per wheel or more. Most rolling tool chests feature a locking system.

While the benefits of a machinist's tool chest have been incorporated into the modern maintenance tool cabinet and its organization, those benefits have not been readily available to personnel who work in the field. Heavy equipment used for earth moving, dredging, and the like requires on-site maintenance and repairs. In some cases, full-time maintenance personnel travel from site to site to perform maintenance and repairs as needed. In many cases, however, the operators themselves perform maintenance and repairs to the equipment. Custom-built maintenance vehicles, which are expensive, may be appropriate for full-time maintenance personnel, but field operators also use specialized, high-quality tools.

Pickup trucks are known for their use as work vehicles. The bed of a pickup truck is generally used to haul tools or items one would not be able to haul in a car. Tool boxes mounted in the bed of the truck provide a secure area to store commonly used items. These tool boxes are generally mounted immediately behind the cab and span the width of the pickup bed. Contents of a behind-the-cab tool box are often difficult to remove because of the location, and the behind-the-cab tool box takes up room in the pickup bed.

The behind-the-cab tool box is especially problematic for heavy equipment operators and service personnel who normally adjust or repair heavy equipment on site. Rainy conditions can make climbing into the pickup bed to gain access to tools stored in the behind-the-cab tool box unsafe and difficult for operators and service personnel. Further, the tools stored are frequently disorganized so the operator or service person must sort through a pile of tools to find the desired tool. Like the machinists of the nineteenth and twentieth centuries, and like the industrial maintenance man of the twenty-first century, today's heavy equipment operators frequently are responsible for providing and securing the tools needed to maintain the heavy equipment they operate.

Equipment operators and maintenance personnel need a tool chest which provides multiple drawers for organization of tools. The multi-drawer tool chest should be easily accessible, but it should also provide security for tools which are often expensive. When not in use, the tool chest should be capable of storage in a convenient location so as not to interfere with use of the pickup bed for transporting small equipment.

SUMMARY OF THE INVENTION

The swing-out tool chest of the present invention provides a multi-drawer tool chest for organization of tools. The multi-drawer tool chest is pivotally mounted in the rear corner of the pickup bed or near the rear doors of a utility van. When not in use, the swing-out tool chest nestles against the side of the vehicle between the tailgate (or rear doors of a utility van) and the wheel well. To gain access to the tools, the operator opens the tailgate and pulls the swing-out tool chest toward the rear of the bed. The tools are easily accessible and, in the case of a pickup, the tail gate provides a convenient work area. The present invention further includes a method of converting a commercially available locking tool chest to a swing-out tool chest mounted in a pickup bed, van, utility truck, or other vehicle.

DETAILED DESCRIPTION

In the following description of the present invention, like numerals and characters designate like elements throughout the figures of the drawings.

Figure 1:
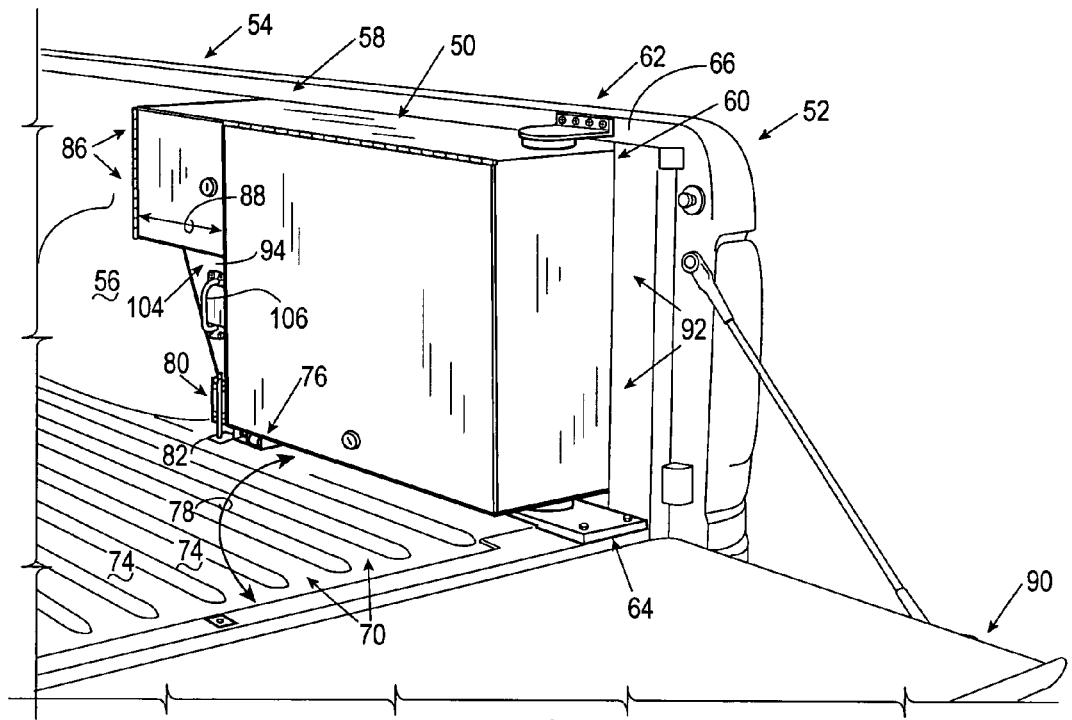
FIG. 1 is a view of a swing-out tool chest according to the present invention.
Figure 2:
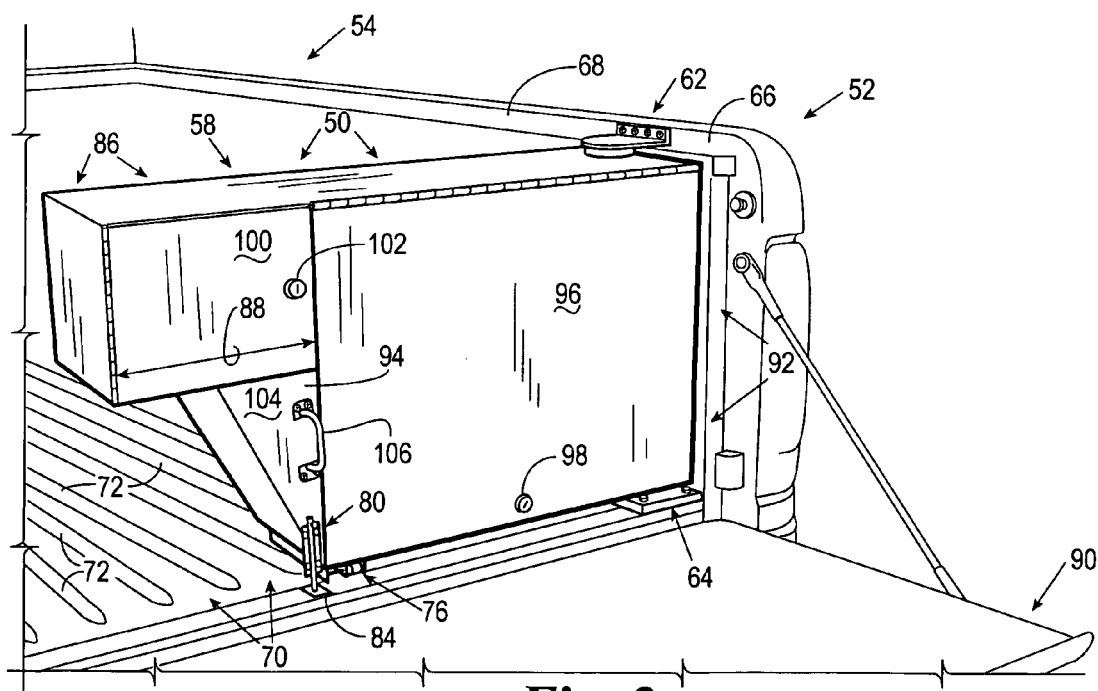
FIG. 2 is another view of the swing-out tool chest shown in FIG. 1.

Referring generally to FIGS. 1-2, a swing-out tool chest 50 is mounted in a rear corner 52 of a pickup bed 54 between the wheel well 56 and the rear corner 52. The swing-out tool chest 50 has a front end portion 58 and a rear portion 60. The rear portion 60 is secured to the pickup bed 54 by a top mounting assembly 62 and a bottom mounting assembly 64. The top mounting assembly 62 is attached to the rail portion 66 of the sidewall 68 of the pickup bed 54. The bottom mounting assembly 64, which supports the weight of the rear portion 60 of the swing-out tool chest 50, is attached to the floor 70 of the pickup bed 54 at the rear corner 52. The uneven pickup bed floor 70 typically includes alternate relatively higher portions referred to herein as ridges 72 and relatively lower portions referred to herein as channels 74. A front end portion support assembly 76 permits the front end portion 58 of the swing-out tool chest 50 of the present invention to roll smoothly across the uneven pickup bed floor 70.

Still referring to FIGS. 1-2, it will be understood by one skilled in the art that the swing-out tool chest 50 moves along arrow 78 between a stowed position (FIG. 1) and a use position (FIG. 2). A latch assembly 80 adjacent the front end portion support assembly 76 mates with a stowed position receiver 82 (FIG. 1) or a use position receiver 84. A projecting arm section 86 extends from the front end portion 60 of the swing-out tool chest 50 above the wheel well 56 (See FIG. 1) of the pickup bed 54. The horizontal dimension 88 of the projecting arm section 86 varies in accordance with the make and model of the particular pickup. The horizontal dimension 88 is also adjustable to permit mounting of two matching swing-out tool chests 50 at the rear of the same pickup bed 54. It will be understood by one skilled in the art that the swing-out tool chest 50 shown in FIGS. 1 and 2 is designed to be mounted in the right rear corner 52 of a pickup bed 54. A mirror-image swing-out tool chest 50A (not shown) of the swing-out tool chest 50 could be mounted in the left rear corner 52A (not shown) of the same pickup bed 54. When the two mirror-image swing-out tool chests 50, 50A are deployed in the use position (See FIG. 2), the projecting arms 86, 86A would meet adjacent the tailgate 90.

Still referring to FIGS. 1-2, the swing-out tool chest 50 includes a large rectangular section 92, the projecting arm section 86, and a gusset-like section 94 extending between the projecting arm section 86 and the large rectangular section 92. Collectively, the rectangular section 92, the projecting arm section 86, and the gusset-like section 94 are referred to as a tool storage chest. The rectangular section 92 has a hinged front cover 96 secured in place by lock 98. The projecting arm section 86 has hinged front cover 100 secured in place by a lock 102. The gusset-like section 94 has a front 104 which supports the latch assembly 80 and a handle 106. Because locks 98, 102 are of a type generally know in the art, details of the engaging tab are not provided.

Although the swing-out tool chest 50 has been illustrated as one having a projecting arm section 86 extending over the wheel well 56 of the pickup bed 54, it will be understood by one skilled in the art that a commercially available locking tool storage chest, of appropriate size, can be modified according to applicant's invention and mounted in the rear corner 52, 52A of a pickup bed 54. Required additions include the upper mounting assembly 62, the bottom mounting assembly 64, the front end portion support assembly 76, the latch assembly 80, and the mating latch receivers 82, 84. The handle 106 could optionally be added to the commercially available locking tool storage chest. Thus the method of the present invention permits modification of commercially available locking tool storage chests to create a swing-out tool chest.

Figure 3:
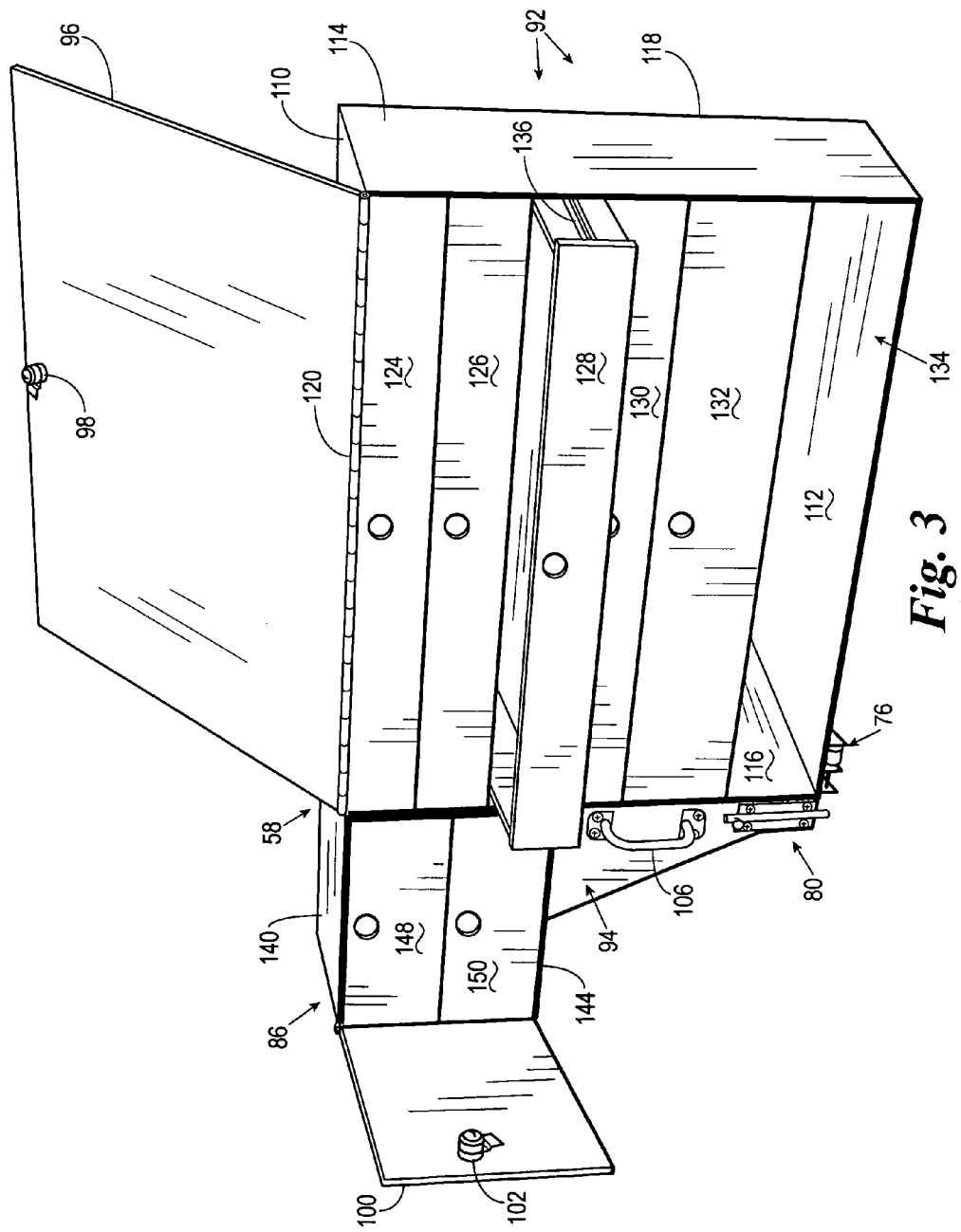
FIG. 3 is a view of a portion of the swing-out tool chest shown in FIGS. 1-2.
Figure 4:
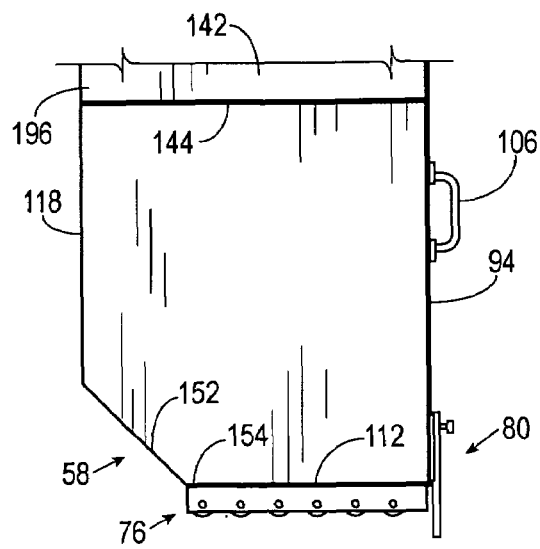
FIG. 4 is another view of the swing-out tool chest shown in FIGS. 1-3.

Referring now to FIG. 3, the large rectangular section 92 has a top 110, a bottom 112, an aft end 114, a forward end 116, and a back 118 (See FIG. 4). The front 96 is attached to the top 110 by a piano hinge 120. The large rectangular section 92 encloses slide-out drawers 124, 126, 128, 130, 132, and an open compartment 134. The slide-out drawers 124, 126, 128, 130, and 132 are supported by drawer slides 136 (only one shown). The projecting arm section 86 has a top 140, which is a continuation of the top 110 of the large rectangular section 92, a forward end 142 (See FIG. 4), a bottom 144, and a back 146 (not shown). The projecting arm section 86 has, as its aft end, the forward end 116 of the rectangular section 92. The projecting arm section 86 encloses an upper slide-out drawer 148 and a lower slide-out drawer 150. The upper and lower slide-out drawers 148, 150 are suspended on drawer slides 136 (not shown).

Referring now to FIG. 3 in conjunction with FIGS. 1 and 2, the hinged front cover 96 of the large rectangular section 92 is deployable between a closed and locked position (FIGS. 1 and 2), wherein access to the slide-out drawers is prevented by the lock 98, and an open position (FIG. 3) wherein the user has easy access to slide-out drawers 124, 126, 128, 130, 132 and the open compartment 134. Similarly, the hinged front cover 100 of the projecting arm section 86 is deployable between a closed and locked position (FIGS. 1 and 2), wherein access to the slide-out drawers 148, 150 is prevented by the lock 102, and an open position (FIG. 3) wherein the user has easy access to the slide-out drawers 148, 150. It will be understood by one skilled in the art that the drawers in the swing-out tool chest 50 can be shallow or deep and that, if desired, an additional drawer could be installed in the open compartment 134.

Figure 5:
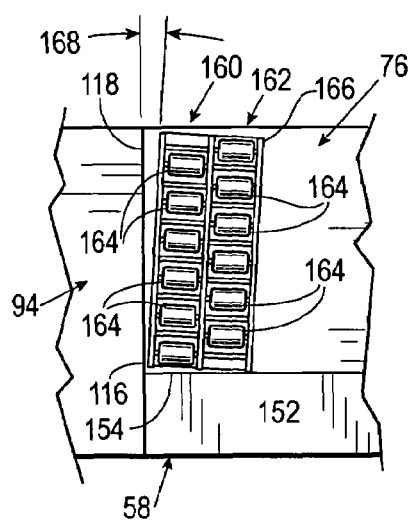
FIG. 5 is another view of the swing-out tool chest shown in FIGS. 1-4.

Referring now to FIGS. 4 and 5, the front end portion 58 of the swing-out tool chest 50, with an upper portion cut away, includes a bevel member 152 connecting the bottom 112 of the large rectangular section 92 (See FIGS. 1-2) to the back 118 of the large rectangular section 92. The bevel member 152 reduces the volume of the open compartment 134 (See FIG. 3) and accommodates a curved configuration present on some pickup models at the junction between the pickup bed floor 70 and the pickup bed side wall 68 (See FIGS. 1-2). This configuration is commonly found on pickup trucks equipped with dual fuel tanks. Still referring to FIGS. 4 and 5, the front end portion support assembly 76 extends from just inside the hinged front cover 96 (See FIGS. 1-2) of the large rectangular section 92 (when the hinged front cover 96 is in the closed and locked position as shown in FIG. 3) to the back edge 154 of the bottom 112.

Referring now to FIG. 5, the front end portion support assembly 76, attached to the bottom 112, is formed by adjacent parallel columns 160, 162 of transverse rollers 164. The transverse rollers 164 in the column 160 are offset with respect to the transverse rollers 164 in the column 162. As a result, the front end portion 58 of the swing-out tool chest 50 is supported at all times by several of the transverse rollers 164 as the front end portion 58 of the swing-out tool chest 50 moves across the ridges 72 of the uneven floor 70 of the pickup bed 54 (See FIGS. 1-3). Furthermore, the front end portion support assembly 76 is positioned on the bottom 112 so that the parallel columns 160, 162 are not parallel to the end 118 of the large rectangular section 92. Instead, the front 166 of the front end portion support assembly 76 is moved away from the end 118 to form a slight angle 168. While the angle 168 need not be precise, an angle of about 5 to 15 degrees has provided smooth movement of the swing-out tool chest 50 from the stowed position (FIG. 1) to the use position (FIG. 2).

The importance of the multiple offset roller structure of the front end portion support assembly 76 cannot be overstated. The tools contained within the slide-out drawers are, collectively, quite heavy, and the raised ridges 72 in the floor 70 of the pickup bed 54 are an obstacle to smooth movement of the loaded swing-out tool chest 50 between the stowed position illustrated in FIG. 1 and the use position shown in FIG. 2. While other materials are also suitable for the transverse rollers 164, self-lubricating Nylatron® rollers made from nylon have been found to work best. If the diameter of the transverse rollers 164 is too large, the weight of the front end portion 58 is supported by only a few transverse rollers 164. The transverse rollers 164 shown in FIGS. 1-5 are about 0.75 inch in diameter. The front end portion support assembly 76 can be welded to the bottom 112 or it can be attached by nuts and bolts (See FIGS. 11, 14, 15, and 16). It will be understood by one skilled in the art that additional columns of transverse rollers 164 could be attached to the bottom 112 at any convenient location, if desired, to support especially heavy tools stores within the swing-out tool chest 50.

Figure 6:
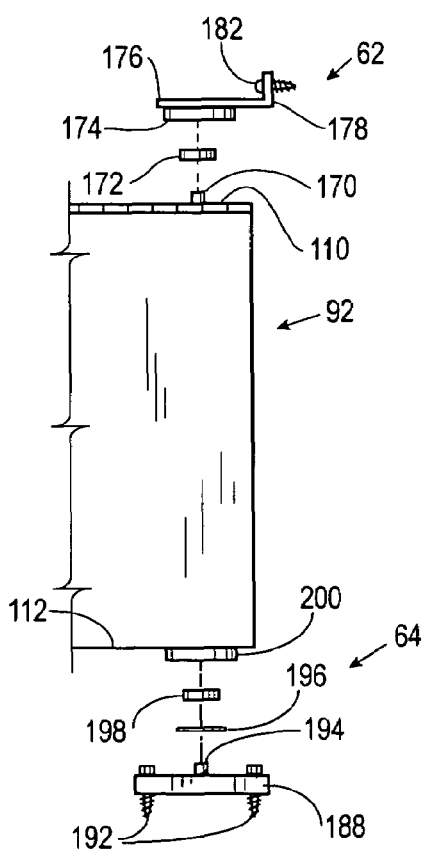
FIG. 6 is an exploded view showing how the swing-out tool chest is mounted to the vehicle.
Figure 7:
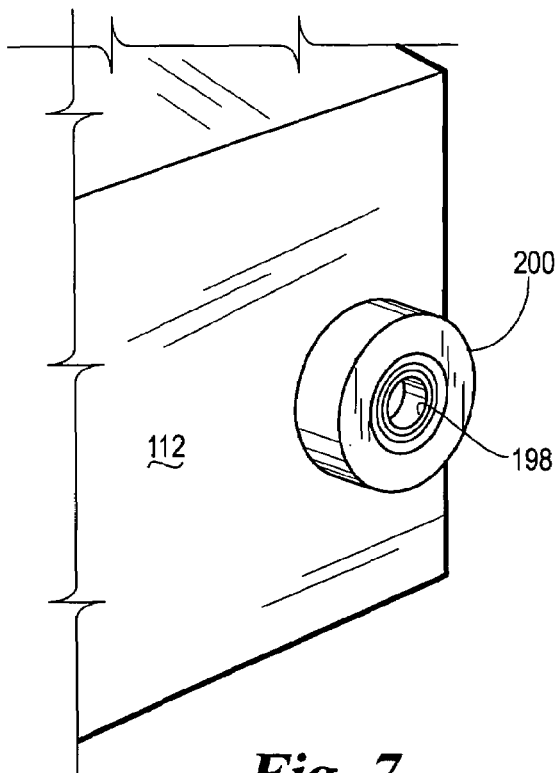
FIG. 7 is an enlarged view of a portion of the mounting hardware shown in FIG. 6.

Referring now to FIGS. 6 and 7, the top mounting assembly 62 and the bottom mounting assembly 64 are shown in exploded view. A top stub axle 170 welded to the top 110 of the large rectangular chest portion 92 receives a top bearing member 172. A top sealed ball bearing 174 welded to a top mounting plate 176 fits down over the top bearing member 172. The top mounting plate 176 has a lip 178. Bores 180 (not shown) in the lip 180 permit attachment of the top mounting plate 176 to the rail portion 66 of the sidewall 68 of the pickup bed 54 (See FIGS. 1 and 2) using screws 182.

Still referring to FIGS. 6 and 7, the bottom mounting assembly 64 consists of a bottom mounting plate 188 having bores 190 (See FIG. 8) therethrough for attachment of the bottom mounting plate 188 to the floor 70 of the pickup bed 54 using attachment screws 192. A bottom stub axle 194 attached to the bottom mounting plate 188 receives a Teflon thrust washer 196 and a bottom bearing member 198. A bottom sealed ball bearing 200 welded to the bottom 112 of the large rectangular portion 92 fits down over the bottom bearing member 198.

Still referring to FIGS. 6 and 7, it will be understood by one skilled in the art that the bottom stub axle 194 and the bottom mounting plate 188 can be machined from a single piece of metal. In the alternative, the bottom stub axle 194 can be welded to the bottom mounting plate 188 or attached by an inner fitting bolt. Similarly, although the top stub axle 170 is shown as being welded to the top 110, the top stub axle 170 could also be tapped and attached to the top 110 by an inner fitting bolt.

Referring now to FIGS. 1-7, the steps for converting a commercially available locking tool storage chest to a swing-out tool chest according to the present invention are apparent as follows:

Attaching a front-end support assembly to the bottom of the left end of the tool chest.

Attaching a sealed ball bearing 200 to the bottom of the right end of the tool chest.

Attaching a top stub axle to the top of the right end of the tool chest.

Attaching the bottom mounting plate 108 to the floor 70 of the pickup bed 54.

Placing the Teflon thrust washer 196 over the bottom stub axle 194 attached to the bottom mounting plate 108.

Placing the bottom bearing member 198 on the bottom stub axle 194 atop the Teflon thrust washer 196.

Placing the sealed ball bearing 200 (which is attached to the bottom 112 of the large rectangular section 92) over the bottom bearing member 198.

Placing the top bearing member 172 over the top stub axle 170.

Placing the top mounting plate 176 and the sealed ball bearing 174 over the top bearing member 172.

Attaching the top mounting plate 176 to the rail portion 66 of the pickup bed 54 using the top mounting plate attachment screws 182.

Optionally, attaching a latch assembly 80 to the bottom left front of the tool chest, a use position latch receiver 84 in the floor 70 of the pickup bed 54 adjacent the tailgate 90, and a stowed position latch receiver 82 in the floor 70 of the pickup bed 54 near the wheel well 56.

Optionally, attaching a handle 106 to the front of the tool chest.

Figure 8:
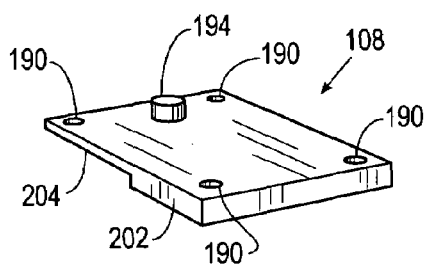
FIG. 8 is a view of another portion of the mounting hardware shown in FIG. 6.

Referring now to FIG. 8, an enlarged detail of the bottom mounting plate 108 shows a thicker portion 202, a thinner portion 204, and the bottom stub axle 194. The thinner portion 204 of the bottom mounting plate 108 accommodates the raised ridges 72 in the floor 70 of the pickup bed 54 (See FIGS. 1-2).

Figure 9:
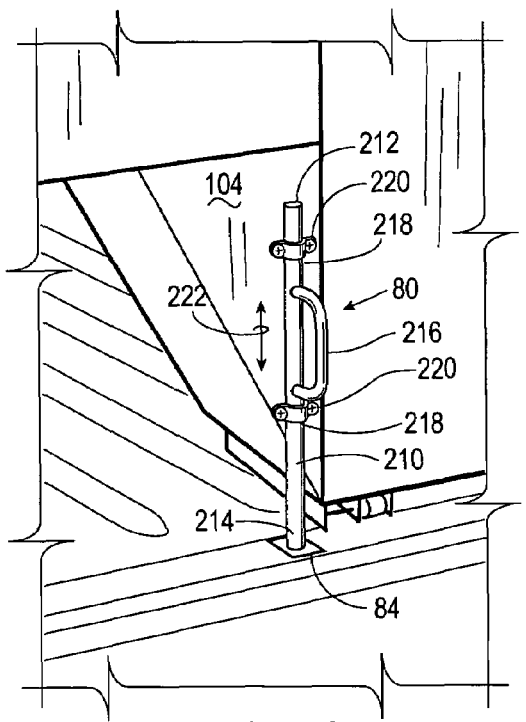
FIG. 9 is a view of a latch pin attached to the moveable end of the swing-out tool chest shown in FIGS. 1-8.

Referring now to FIG. 9, the latch assembly 80 is shown in enlarged detail. A sliding latch member 210 has an upper end 212, a lower end 214, and a handle 216. The sliding latch member 210 is mounted on the front 104 of the gusset-like section 94 of the swing-out tool chest 50 by brackets 218 held in place by screws 220. The sliding latch member 210 slides in the direction indicated by arrow 222 to permit the lower end 214 to engage the use position latch receiver 84 (See also FIG. 2) or the stowed position latch receiver 82 (See FIG. 1).

Figure 10:
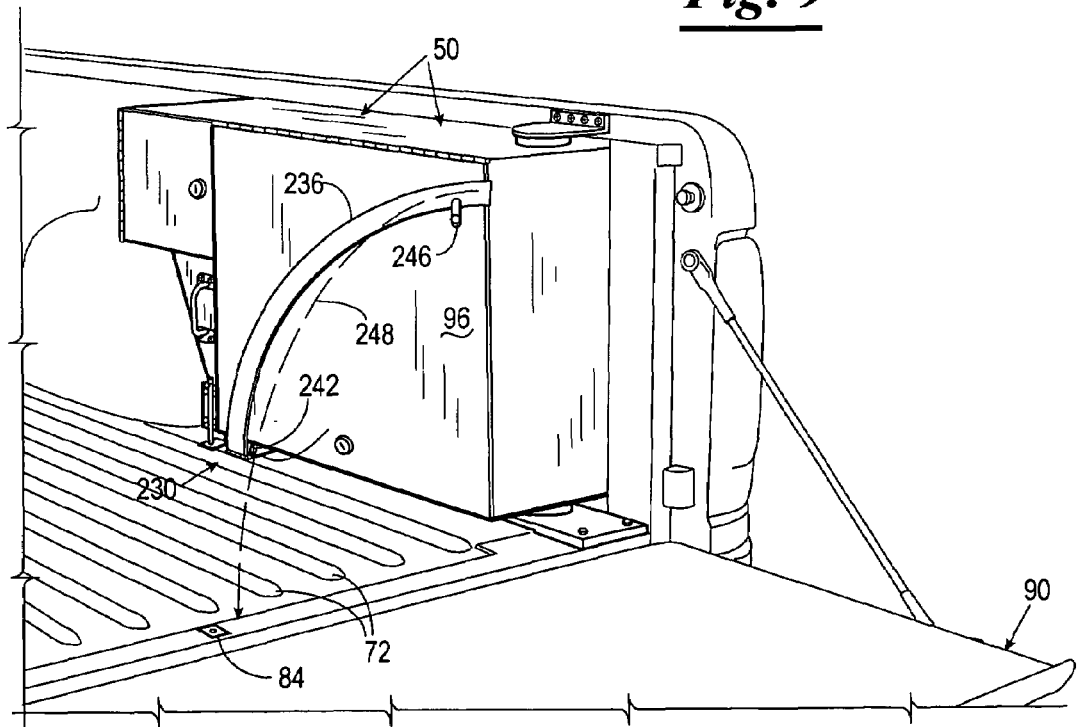
FIG. 10 is a view of another swing-out tool chest according to the present invention.
Figure 11:
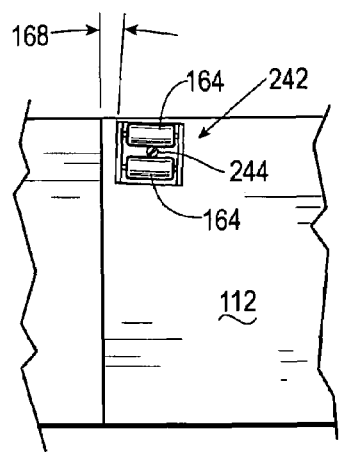
FIG. 11 is a view of a portion of the bottom of the swing-out tool chest shown in FIG. 10.
Figure 12:
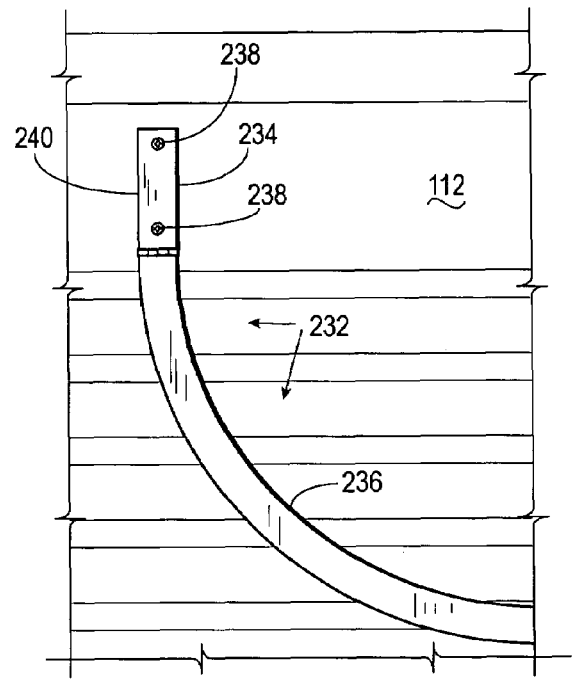
FIG. 12 is a view of another portion of the swing-out tool chest shown in FIGS. 10-11.

Referring now to FIGS. 10-12, another front end portion support assembly 230 is shown. A two-section track 232 has a straight short section 234 and a hinged curved section 236. The short section 234 is attached to the bottom 112 of the large rectangular section 92 (See FIGS. 1-3) by attachment screws 238 (See FIG. 12). Spacers 240 (not shown) hold the short section 234 away from the bottom 112 to permit clearance by a pair of transverse rollers 164 rotatably mounted in a frame 242 attached to the bottom 112 by an attachment screw 244. When the swing-out tool chest 50 is deployed in the stowed position (FIG. 10), the hinged curved section 236 of the two-section track 232 is held in place against the front cover 96 by a rotatable tab 246.

Referring again to FIGS. 10-12, to deploy the swing-out tool chest 50 in the use position (See FIG. 2), the tab 246 is rotated to release the hinged curved section 236. The hinged curved section 236 then moves along the direction of arrow 248 to create a smooth pathway across the raised ridges 72 in the floor 70 of the pickup bed 54. As shown in FIGS. 1-2, The transverse rollers 164 support the front end portion 58 of the swing-out tool chest 50 as the projecting arm section 86 is moved from its stowed position over the wheel well 56 to a use position adjacent the tailgate 90.

Referring now to FIGS. 13-17, alternate structures for the front end portion support assembly are illustrated.

Figure 13:
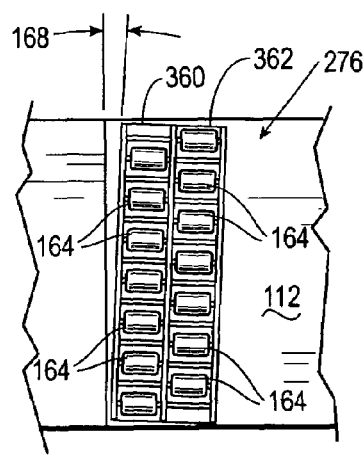
FIG. 13 shows an optional dual offset-column roller assembly welded to the bottom of the swing-out tool chest according to the present invention.

In FIG. 13, a front end portion support assembly 276, attached to the bottom 112, is formed by adjacent parallel columns 360, 362 of transverse rollers 164. Whereas each parallel column 60, 62 of transverse rollers in FIGS. 1-5 contained six transverse rollers 164, each parallel column 360, 362 of transverse rollers 164 contains seven transverse rollers 164.

Figure 14:
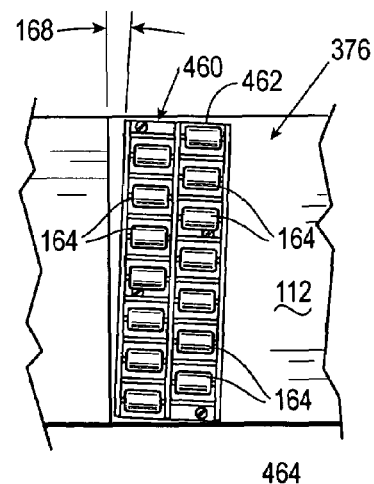
FIG. 14 shows an optional screw-on dual offset-column roller assembly attached to the bottom of the swing-out tool chest according to the present invention.

In FIG. 14, a front end portion support assembly 376, attached to the bottom 112 by attachment screws 464, is formed by connected parallel columns 460, 462 of transverse rollers 164. Whereas each parallel column 60, 62 of transverse rollers in FIGS. 1-5 contained six transverse rollers 164, each parallel column 460, 462 of transverse rollers 164 contains seven transverse rollers 164.

Figure 15:
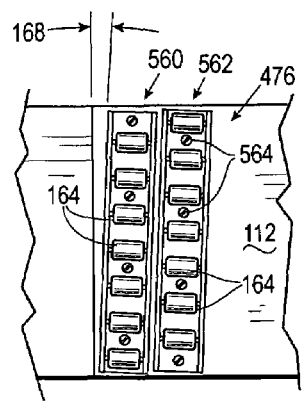
FIG. 15 shows separate screw-on roller assemblies attached to the bottom of the swing-out tool chest according to the present invention.

In FIG. 15, a front end portion support assembly 476 consists of adjacent unconnected parallel columns 560, 562 of transverse rollers 164 attached to the bottom 112 by screws 564.

Figure 16:
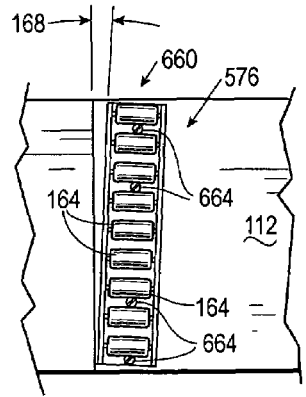
FIG. 16 shows an optional screw-on single column roller assembly attached to the bottom of the swing-out tool chest according to the present invention.

In FIG. 16, a front end portion support assembly 576 consists of a single column 660 of transverse rollers 164 attached to the bottom 112 by screws 664. The single column 660 contains nine transverse rollers 164 to provide multiple rolling surfaces to contact the raised ridges 72 in the floor 70 of the pickup bed 54 so the front end portion 58 of the swing-out tool chest 50 moves smoothly from the stowed position (FIG. 1) to the use position (FIG. 2).

Figure 17:
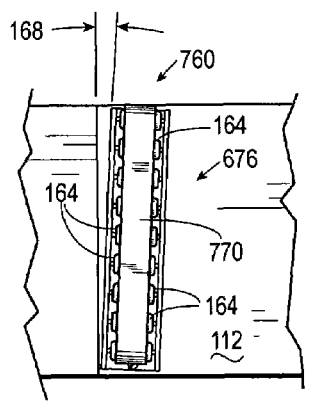
FIG. 17 shows an optional track attached to the bottom of the swing-out tool chest according to the present invention.

In FIG. 17, a front end portion support assembly 676 consists of a single column 760 of transverse rollers 164 attached to the bottom 112 by screws 764 (not shown). The single column 760 contains nine transverse rollers 164 to provide multiple rolling surfaces to contact the raised ridges 72 in the floor 70 of the pickup bed 54 so the front end portion 58 of the swing-out tool chest 50 moves smoothly from the stowed position (FIG. 1) to the use position (FIG. 2). A track member 770 mounted on the transverse rollers 164 further facilitates smooth operation of the swing-out tool chest 50.

Figure 18:
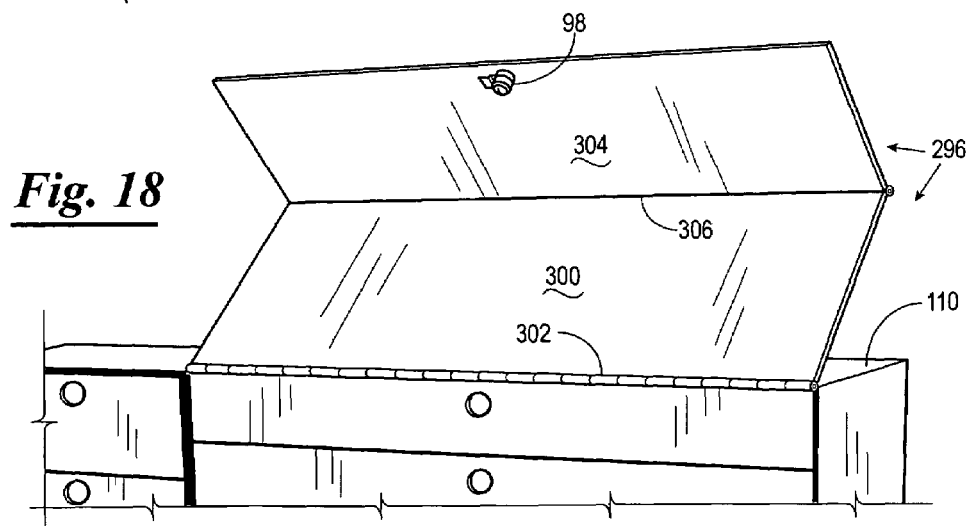
FIG. 18 shows an optional folding front attached to the swing-out tool chest according to the present invention.

Referring now to FIG. 18, another cover 296 of the large rectangular section 92 of the swing-out tool chest 50 consists of a top cover section 300 attached to the top 110 by a piano hinge 302 and a bottom cover section 304 attached to the top cover section 300 by another piano hinge 306. The hinge 306 allows the bottom cover section 304 of the cover 296 to fold in accordion fashion across the top 110 of the large rectangular section 92 (See FIGS. 1-3) of the swing-out tool chest 50.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

I claim:

1. A swing-out tool chest for mounting in a rear corner of the bed of a pickup, wherein the pickup bed is characterized as having a front wall, two side walls, a rail portion on each side wall, a floor, and a tailgate, the swing-out tool chest comprising:

a tool storage chest, further comprising:
        a large rectangular section having a front end portion and a rear portion;
        a projecting arm section extending from a top of the front end portion of the large rectangular section; and
        a gusset-like section between the large rectangular section and the projecting arm section;
    mounting means for pivotally mounting the rear portion of the large rectangular section in the rear corner of the pickup bed;
    a front end portion support assembly for supporting the front end portion of the large rectangular section, so the tool storage chest is supported by the mounting means and the front end portion support assembly; and
    wherein the tool storage chest is deployable between a stowed position, wherein the tool storage chest is nestled against the sidewall of the pickup and a use position, wherein the tool storage chest extends across the rear of the pickup in general alignment with the tailgate.

2. The device of claim 1, wherein the large rectangular section of the tool storage chest further comprises a hinged cover, a rear, a top, a bottom, a forward end, an aft end, and a plurality of drawers contained therein.

3. The device of claim 1, wherein the projecting arm section of the tool storage chest further comprises a hinged cover, a rear, a top, a bottom, a forward end, an aft end, and a plurality of drawers contained therein.

4. The device of claim 1, further comprising latching means for securing the tool storage chest in the stowed position or the use position.

5. The device of claim 1, further comprising a handle attached to the tool storage chest for use in moving the tool storage chest between the stowed position and the use position.

6. The device of claim 1, wherein the mounting means for pivotally mounting the rear portion of the large rectangular section in the rear corner of the pickup bed further comprises:
 a top mounting assembly attached to the rail portion of the sidewall of the pickup;
 a bottom mounting assembly attached to the floor of the bed of the pickup; and
 wherein the rear portion of the large rectangular section of the tool storage chest is supported by the bottom mounting assembly and the rear portion is suspended between the top mounting assembly and the bottom mounting assembly.

7. The device of claim 6, wherein the top mounting assembly further comprises:
 a top stub axle welded to the top of the aft end of the large rectangular chest portion of the tool storage chest;
 a top bearing member
 a top sealed ball bearing welded to a top mounting plate, the top mounting plate having a lip potion, the lip portion having a plurality of bores therethrough, so the top sealed ball bearing fits down over the top bearing member; and
 attachment screws for attaching the lip portion of the top mounting plate to the rail portion of the sidewall of the pickup bed.

8. The device of claim 7, wherein the bottom mounting assembly further comprises:
 a bottom mounting plate having a plurality of bores therethrough for attachment of the bottom mounting plate to the floor of the pickup bed using a plurality of attachment screws;
 a bottom stub axle attached to the bottom mounting plate;
 a thrust washer received by the bottom stub axle and supported by the bottom mounting plate;
 a bottom bearing member received by the bottom stub axle and supported by the thrust washer;
 a bottom sealed ball bearing welded to the bottom of the large rectangular portion of the tool storage chest; and
 wherein the bottom sealed ball bearing fits down over the bottom bearing member so the rear portion of the swing-out tool chest is supported by the bottom mounting assembly.

9. The device of claim 1, wherein the front end portion support assembly further comprises:
 two parallel columns of transverse rollers attached to the bottom of the large rectangular section of the tool storage chest, wherein the transverse rollers in the first parallel column are offset with respect to the transverse rollers in the second parallel column, so the front end portion of the swing-out tool chest is supported at all times by several of the transverse rollers as the front end portion of the swing-out tool chest moves across the floor of the pickup bed.

10. The device of claim 9, wherein the front end portion support assembly is positioned on the bottom of the large rectangular section of the tool storage chest so that the parallel columns form an angle of 5 to 15 degrees with respect to the end of the large rectangular section.

11. The device of claim 1, wherein the front end portion support assembly further comprises a plurality of transverse rollers disposed within a frame, the frame being attached to the bottom of forward end of the large rectangular section.

12. The device of claim 1, further comprising a plurality of transverse rollers disposed within a frame, the frame being attached to the bottom of the large rectangular section essentially midway between the front end portion support assembly and the rear portion of the swing-out tool chest.

13. The device of claim 1, wherein the front end portion support assembly further comprises:
 a two-section track, the two-section track further comprising:
  a straight short section attached to the bottom of the forward end of the large rectangular section of the tool storage chest, the straight short section having a hinge extending just beyond the front cover of the large rectangular section; and
  a longer curved section attached to the straight short section at the hinge, whereby the longer curved section folds upwardly across the front cover when the swing-out tool chest is in the stowed position and whereby the longer curved section folds down onto the floor of the pickup bed for movement of the swing-out tool chest from the stowed position to the use position;
 a plurality of transverse rollers rotatably mounted in a frame attached to the bottom of the large rectangular section by at least one attachment screw;
 a rotatable tab attached to the front cover to secure the longer curved section in position against the front cover when the swing-out tool chest is in the stowed position; and
 wherein, when the tab is moved to release the longer curved section, the longer curved section folds down onto the floor of the pickup bed, and the transverse rollers attached to the bottom of the large rectangular section travel upon the longer curved section as the tool storage chest is moved from the stowed position to the use position.

14. The device of claim 9, wherein each of the parallel columns contains at least six transverse rollers.

15. The device of claim 9, wherein the parallel columns are disposed within a single frame welded to the bottom of the large rectangular section.

16. The device of claim 9, wherein the parallel columns are disposed within a single frame attached to the bottom of the large rectangular section by screws.

17. The device of claim 1, wherein the front end portion support assembly consists of adjacent unconnected parallel columns of transverse rollers, the frame being attached to the bottom of the large rectangular section at the forward end thereof.

* * * * *